Sept. 13, 1932.　　A. STERN ET AL　　1,877,609
MOTOR VEHICLE
Filed July 2, 1930　　2 Sheets-Sheet 1
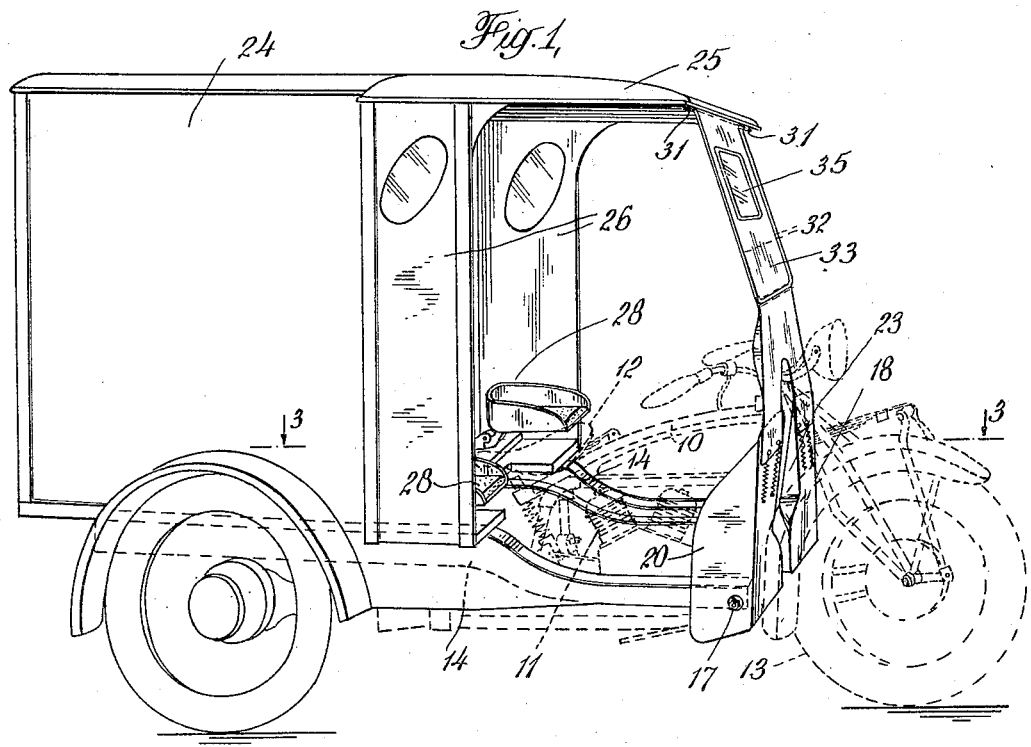
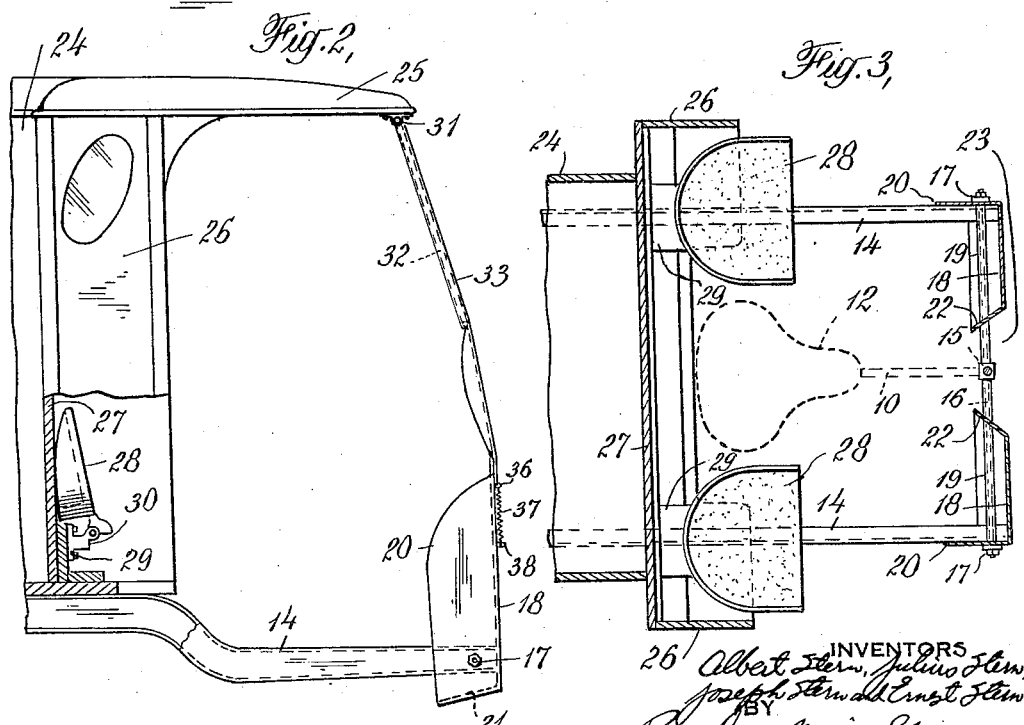

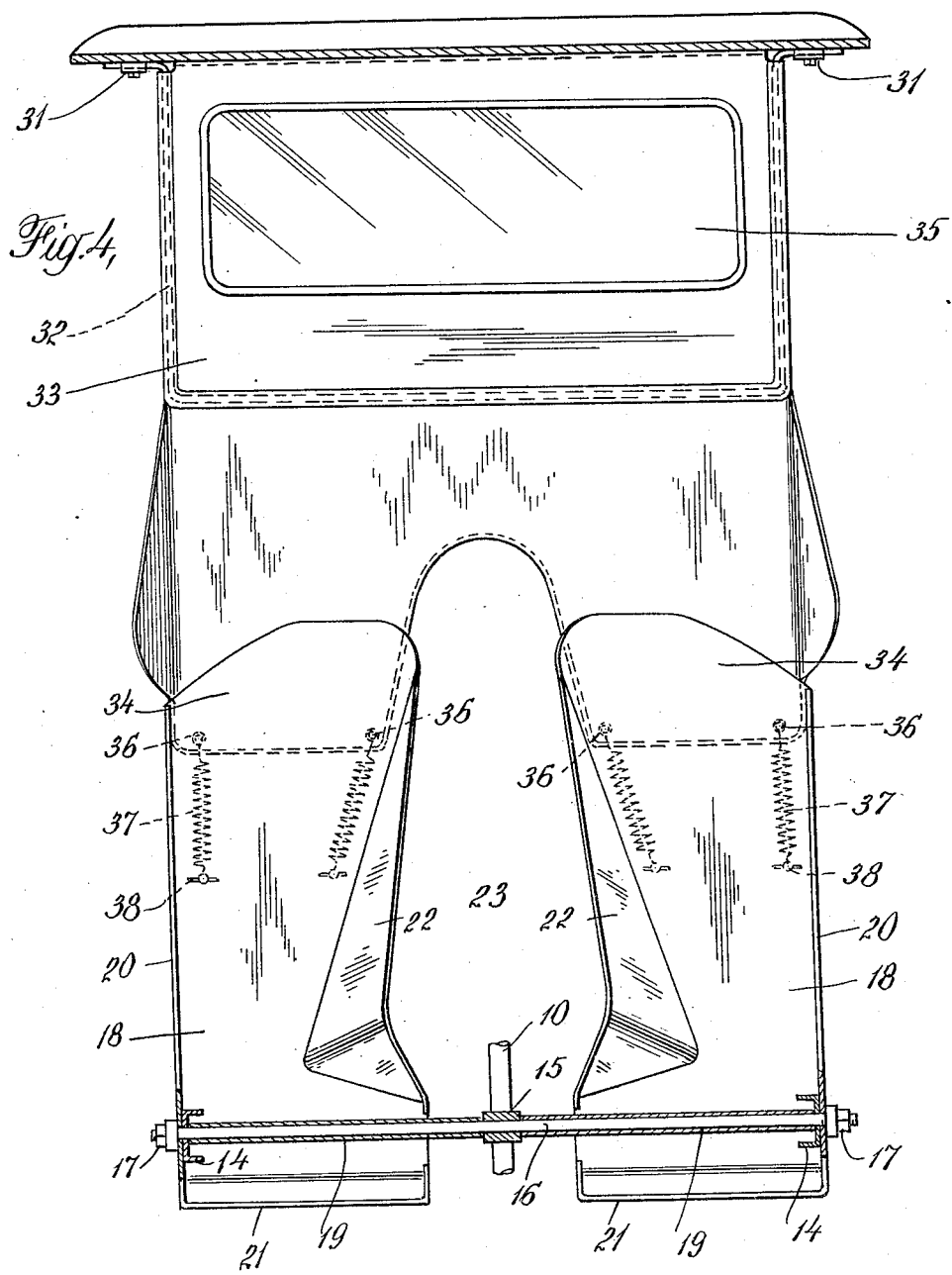

Patented Sept. 13, 1932

1,877,609

UNITED STATES PATENT OFFICE

ALBERT STERN, JOSEPH STERN, JULIUS STERN, AND ERNEST STERN, OF NEW YORK, N. Y., ASSIGNORS, BY MESNE ASSIGNMENTS, TO INDIAN MOTOCYCLE COMPANY, OF SPRINGFIELD, MASSACHUSETTS, A CORPORATION OF MASSACHUSETTS

MOTOR VEHICLE

Application filed July 2, 1930. Serial No. 465,296.

This invention relates to motor vehicles of the tricycle type in which a pair of rear wheels are driven from a suitable source of power and the single front wheel is steerable to guide the vehicle.

The invention is particularly concerned with a motor tricycle which is adapted from a standard motorcycle, and it is the principal object of this invention to provide an attachable chassis for a motorcycle, whereby the latter is converted into an enclosed vehicle, wherein the operator and passengers are comfortably housed against the weather and whereby merchandise may be transported conveniently and rapidly.

Another object of the invention is to provide on a motor vehicle of the type described, a front which serves as a shield for protecting the operator against injury in traffic and against the weather, while at the same time providing a novel wind funnel for collecting and directing air across the radiation surfaces of the engine, whereby a more effective and efficient cooling action is procured than heretofore.

A further object of this invention is to provide improvements and additions to the motor tricycle disclosed in a copending application, Serial No. 432,144, filed February 28, 1930, by Albert, Julius and Joseph Stern.

These and other objects of the present invention are realized in a preferred embodiment thereof, comprising a two-wheeled chassis attachable to the frame of a standard motorcycle by removing the rear wheel of the latter and securing its rear fork to the chassis and the front of the chassis to the frame in the general manner described in detail in the aforementioned copending application.

In the new arrangement of this invention, the rear end of the chassis is arranged as before, but the front ends of the channel side members of the chassis frame are secured to opposite ends of a cross rod driven through an eye on the motorcycle frame and bearing spacing tubes for properly centering the chassis with respect to the motorcycle frame.

Also secured to the front end of the chassis by means of the cross rod are a pair of sheet metal leg guards which extend vertically, one on each side of the front wheel of the vehicle and serve to protect the operator from injury and splashing during wet weather. These guards are formed at their inner edges with rearwardly directed flanges which cooperate to form a wind funnel around the front wheel of the vehicle for collecting and directing a stream of air upon the engine when the vehicle is in motion, whereby the guard aids in the engine cooling action instead of detracting therefrom as might be supposed.

The body of the vehicle is mounted upon the chassis in any convenient way and extends behind the operator but the roof thereof is extended forwardly over the operator's position. Secured to the front of the body, but behind and at either or both sides of the operator is a single collapsible seat for accommodating a passenger.

The front edge of the forwardly extending roof of the body is fitted with a depending U-shaped frame arranged to swing backwardly and forwardly and supporting a sheet of flexible material such as fabric or leather which serves as a wind guard for the operator. Inserted in this flexible wind guard in line with the operator's eyes is a transparent window and the lower edge of the flexible guard is bifurcated to straddle the front wheel and steering mechanism and is secured by resilient means to the sheet metal leg guards. This flexible wind guard protects the operator against the weather, while, by flexing, permitting the necessary resiliency of the body enclosure as the vehicle negotiates rough roads.

For a better understanding of this invention, reference may be had to the accompanying drawings, in which Figure 1 is a perspective view of the motor vehicle of this invention;

Fig. 2 is a partial side view of the same, showing the passenger's seat;

Fig. 3 is a plan of the seating arrangement as seen along the line 3—3 of Fig. 1; and Fig. 4 is an enlarged inside view of the front of the vehicle, portions thereof being shown in section.

In these drawings, numeral 10 designates the frame of a standard motorcycle having the engine 11, the saddle 12 for the operator or driver, and the front steering wheel 13, the rear wheel having been removed and the rear fork secured to the two-wheeled chassis frame 14 in the manner described in the aforementioned copending application, so that the motorcycle is converted in to a delivery car for transporting merchandise with economy, ease, and rapidity.

Clamped or otherwise secured to the front of the motorcycle frame 10 is an eye 15 shown particularly in Fig. 3. Driven through the eye 15 and fitting therein with a tight fit is a steel rod 16 which extends equidistant from each side of the eye 15. The opposite ends of rod 16 are threaded for the reception of nuts 17 for securing to the rod 16 the forwardly extending ends of the chassis frame 14 and the leg guards 18, which will be described in greater detail later. The forwardly extending ends of the chassis frame 14 and the guards 18 are properly spaced laterally of the motorcycle frame 10 by means of lengths of pipe 19, which are slipped over rod 16 as shown in Fig. 4. In assembling, the rod 16 is driven through the eye 15 so as to extend an equal distance on either side thereof, and then the spacer pipes 19 are slipped over the opposite ends of rod 16 to abut opposite sides of eye 15. The opposite ends of the rod 16 are then slipped through the openings in the ends of chassis frame 14 and the outer flanges of guards 18, which thus are securely clamped against the extreme outer ends of spacer pipes 19 when the nuts 17 are tightened down on the threaded opposite ends of rod 16, this assembly being shown in detail in Fig. 4.

The leg guards 18 are preferably formed of pressed sheet steel in the shape best shown in Fig. 4, so that each is provided with an outer side flange 20, a bottom flange 21 and a sloping inner flange 22 having the peculiar shape shown in Fig. 4. As shown in Fig. 1, the leg guards 18 are located immediately behind the front wheel 13, and extend laterally therefrom, the mud-guard of the front wheel projecting slightly into the space 23 formed between the inner flanges 22 of the leg guards 18 without affecting the steering facility of the vehicle. When these leg guards are assembled on the ends of the chassis frame 14, the two inner flanges 22 thereof cooperate to form a funnel-shaped opening which is directed toward the motorcycle engine 11, so that when the vehicle is moving, air is collected by these funnel-shaped flanges 22 and directed rearwardly upon the radiating surfaces of the engine 11, whereby the engine is cooled more efficiently and effectively than when the motorcycle is operated without this arrangement, inasmuch as the air in the latter case is not directed upon the engine, but flows freely from all directions. Accordingly, instead of diminishing the flow of engine cooling air by being in front of the latter, the guards 18, by their peculiar shape, greatly augment and improve the engine cooling.

In addition to aiding the cooling action of the engine, the leg guards 18 are so arranged as to form a guard for the operator's legs against injury in traffic, and protects them from splashing during wet weather, the outer side flanges 20 extending for a considerable distance rearwardly, and the inner flanges 22 cooperating with the mudguard of the front wheel to further protect the operator from splashing, while the bottom flanges 21 also aid in performing this function.

Mounted on the chassis frame 14 behind the driver's saddle 12 is a body 24 of any desired shape for transporting merchandise or other articles, this body having a forwardly extending roof or hood 25 which reaches over the operator's saddle 12 and protects him against the weather, while the walls of the body 24 have forwardly extending sides 26, which partially protect the operator from the side against the weather. As shown particularly in Figs. 1, 2, and 3, the side wall extensions 26 project laterally beyond the side walls of body 24 to provide a wider space between them than the normal width of the body 24 permits. The recess thus formed between the side wall extensions 26 and the front wall 27 of the body 24, not only provides a space for the vehicle operator as he sits in his saddle 12, but also provides a space for two passengers, each sitting behind and to one side of the operator.

As shown particularly in Figs. 2 and 3, two folding seats 28 are placed against the wall 27 at opposite sides of the saddle 12. The seat 28 may be of any form, but it is preferred that it consist of a cast iron bracket 29 secured to the front wall 27 of the body 24, this bracket having a hinge element which cooperates with a corresponding hinge element on the seat proper 28, each of the hinge members having lugs 30 which engage to hold the seat in horizontal position when it is lowered, as shown in dotted lines in Fig. 2. Thus, the enclosure formed by the roof extension 25, the side wall extensions 26, and the front wall 27 of the body 24 will accommodate three persons, namely, the operator of the vehicle who sits on his saddle 12 in the usual way, and two passengers each occupying a seat 28 on either side of the operator.

Journalled in brackets 31 secured to the under side of the forward edge of the roof extension 25, so as to swing backwardly and forwardly, is a U-shaped frame 32, upon which is secured a wind-shield 33 of flexible material such as fabric, leather, or imitation leather, the lower edge of which is bifurcated so as to provide downwardly directed flaps 34, which straddle the handle-bar support of the motorcycle, as shown particularly in Fig. 1. Inserted in the wind-shield 33 within the confines of U-shaped frame 32 is a window 35 which is arranged opposite the operator's head so that he can obtain a clear view forward.

The lower flaps 34 of the wind-shield 33 are each provided with a pair of eyes 36, in each of which is hooked the end of a coil spring 37 bearing a split pin 38, which is adapted to be inserted through a hole in the front surface of leg guard 18, and then bent over for resiliently holding down the lower edge of the wind-shield 33. It will be seen that the leg guards 18 and the wind-shield 33 cooperate to form a shield for protecting the operator and the passengers against the weather and the wind, the leg guards 18, being of sheet steel, providing an additional protection for the operator against injury in traffic.

The new invention provides many advantages over motor vehicles heretofore known, in that it provides a convenient, inexpensive and readily handled vehicle for traversing traffic with rapidly and ease, while providing a medium for delivering small packages, which do not warrant the expense and trouble of a large motor car. The arrangement of this invention provides accommodations for two passengers as well as the operator, who are housed in an enclosure formed jointly by the body of the vehicle, and a shield at the front of the vehicle. This shield is partly rigid and partly flexible, the rigid portion constituting the leg guards which protect the operator from injury as well as exposure to the weather and splashing during wet weather, while the flexible portion protects the operator and the passengers against the weather, while at the same time flexing freely to permit the unavoidable vibration which accompanies travel over rough pavement, and which would result in injury to the vehicle if the shield were made entirely rigid. While a preferred embodiment of the invention has been illustrated and described herein, it is to be understood that the invention is not limited thereby, but is susceptible of many variations in form and detail within its scope.

We claim:

1. In a motor vehicle, the combination of a motorcycle frame having an engine, a chassis frame attached to said motorcycle frame, and wind-deflecting members secured to one of said frames for directing cooling air against the engine when the vehicle is in motion.

2. In a motor vehicle, the combination of a motorcycle frame having an engine, a chassis frame attached to said motorcycle frame, and means secured to one of said frames and extending laterally from opposite sides of the front wheel, said means having rearwardly directed inner flanges adjacent the front wheel.

3. In a motor vehicle, the combination of a motorcycle frame having an engine, a chassis frame attached to said motorcycle frame, and a wind-shield extending upwardly from one of said frames across the front of the vehicle, said shield having a funnel-shaped opening for directing a current of air upon the engine when the vehicle is in motion.

4. In a motor vehicle, the combination of a motorcycle frame having an engine, a chassis frame attached to said motorcycle frame and extending on both sides thereof, a body on said chassis frame and having an open front, and a wind-shield extending upwardly from opposite sides of the front wheel across the open front of said body.

5. In a motor vehicle, the combination of a motorcycle frame having an engine, a chassis frame attached to said motorcycle frame and extending on both sides thereof, a hood mounted on one of said frames and extending forwardly over the operator's position, and a wind-shield suspended from said hood and extending across the front of the vehicle.

6. In a motor vehicle, the combination of a motorcycle frame having an engine, a chassis frame attached to said motorcycle frame and extending on both sides thereof, a body on said chassis, a roof on the front portion of said body extending over the operator's position, and a wind-shield suspended at its upper edge from said roof extension and secured at its lower edge to a lower part of the vehicle.

7. In a motor vehicle, the combination of a motorcycle frame having an engine, a chassis frame attached to said motorcycle frame and extending on both sides thereof, a hood mounted on one of said frames and extending over the operator's position, and shield means secured to one of said frames and extending laterally and upwardly from opposite sides of the front wheel across the front of the vehicle.

8. In a motor vehicle, the combination of a motorcycle frame having an engine, a chassis frame attached to said motorcycle frame, a hood mounted on one of said frames and extending over the operator's position, a rigid guard extending laterally from opposite sides of the front wheel, and a flexible wind-shield extending between said hood and guard across the front of the vehicle.

9. In a motor vehicle, the combination of a motorcycle frame having an engine, a chassis frame attached to said motorcycle frame, a rod secured to the front of said motorcycle frame and extending laterally to either side thereof, extensions in said chassis frame lying along opposite sides of said motorcycle frame, means securing said extensions to opposite ends of said rod, and spacers on said rod for spacing said extensions from opposite sides of said motorcycle frame.

10. In a motor vehicle, the combination of a motorcycle frame having an engine, a chassis frame attached to said motorcycle frame, a rod secured to the front of said motorcycle frame and extending laterally to either side thereof, extensions in said chassis frame lying along opposite sides of said motorcycle frame, upwardly extending guards at either side of the front wheel of the motorcycle frame, and means securing said extensions and guards to opposite ends of said rod.

11. In a motor vehicle, the combination of a motorcycle frame having an engine, a chassis frame attached to said motorcycle frame, a rod secured to the front of said motorcycle frame and extending laterally to either side thereof, extensions in said chassis frame lying along opposite sides of said motorcycle frame, a hood mounted on one of said frames and extending over the operator's position, a shield suspended at its upper edge from said hood, and means securing said extensions and the lower edge of said shield to the opposite ends of said rod.

12. In a motor vehicle, the combination of a motorcycle frame having an engine, a chassis frame attached to said motorcycle frame, a rod secured to the front of said motorcycle frame and extending laterally to either side thereof, extensions in said chassis frame lying along opposite sides of said motorcycle frame, a shield extending laterally from opposite sides of the front wheel and upwardly across the front of the vehicle, said shield having an opening for directing air upon the engine when the vehicle is moving, and means securing said shield and said extensions to opposite ends of said rod.

13. In a motor vehicle, the combination of a motorcycle frame, a hood mounted on said frame and extending over the operator's position, a rigid guard extending laterally from opposite sides of the front wheel, and a flexible windshield extending between the hood and guard across the front of the vehicle.

14. In a motor vehicle, the combination of a motorcycle frame having an engine, a hood mounted on said frame and extending over the operator's position, wind-deflecting members secured to said frame for directing cooling air against the engine when the vehicle is in motion, and a flexible wind-shield extending between the hood and the wind-deflecting members across the front of the vehicle, whereby the front of the vehicle is entirely enclosed.

15. In a motor vehicle, the combination of a motorcycle frame, a hood mounted on said frame and extending over the operator's position, a rigid guard extending laterally from opposite sides of the front wheel, a flexible windshield suspended from the hood and extending across the front of the vehicle, and connections between the lower end of the windshield and the guard, whereby the front of the vehicle is entirely enclosed.

In testimony whereof we affix our signatures.

ALBERT STERN.
JOSEPH STERN.
JULIUS STERN.
ERNEST STERN.